(12) United States Patent
Rice

(10) Patent No.: US 8,017,853 B1
(45) Date of Patent: Sep. 13, 2011

(54) NATURAL HUMAN TIMING INTERFACE

(76) Inventor: Robert Allen Rice, Bevington, IA (US)

( * ) Notice: Subject to any disclaimer, the term of this patent is extended or adjusted under 35 U.S.C. 154(b) by 317 days.

(21) Appl. No.: 12/177,009

(22) Filed: Jul. 21, 2008

Related U.S. Application Data

(63) Continuation-in-part of application No. 11/523,194, filed on Sep. 19, 2006, now abandoned.

(51) Int. Cl.
*G10H 1/00* (2006.01)
*G10H 1/18* (2006.01)

(52) U.S. Cl. .................. 84/615; 84/616; 84/653; 84/654

(58) Field of Classification Search .................. None
See application file for complete search history.

(56) References Cited

U.S. PATENT DOCUMENTS

| | | | | |
|---|---|---|---|---|
| 2,095,213 | A * | 10/1937 | English | 84/484 |
| 3,243,494 | A * | 3/1966 | Park | 84/714 |
| 4,380,185 | A | 4/1983 | Holcomb | |
| 4,530,267 | A | 7/1985 | Garfield | |
| 5,850,048 | A * | 12/1998 | Ruf | 84/484 |
| 6,132,337 | A | 10/2000 | Krupka et al. | |
| 6,230,047 | B1 | 5/2001 | McHugh | |
| 7,557,287 | B2 * | 7/2009 | Wilson et al. | 84/484 |
| 2001/0015123 | A1 | 8/2001 | Nishitani et al. | |
| 2002/0148347 | A1 * | 10/2002 | Herberger et al. | 84/636 |
| 2004/0200336 | A1 * | 10/2004 | Senoo et al. | 84/612 |
| 2004/0250672 | A1 * | 12/2004 | Moodie | 84/636 |
| 2004/0255756 | A1 | 12/2004 | Nagakura | |
| 2006/0054003 | A1 * | 3/2006 | Duke | 84/464 R |
| 2006/0101983 | A1 * | 5/2006 | Boxer | 84/484 |
| 2007/0089592 | A1 * | 4/2007 | Wilson et al. | 84/612 |
| 2009/0084250 | A1 * | 4/2009 | Hennig et al. | 84/609 |
| 2009/0277321 | A1 * | 11/2009 | Sturch | 84/477 R |
| 2009/0308228 | A1 * | 12/2009 | Hurwitz et al. | 84/612 |

* cited by examiner

*Primary Examiner* — Marlo Fletcher
(74) *Attorney, Agent, or Firm* — McKee, Voorhees & Sease, P.L.C.

(57) ABSTRACT

Methods and systems for simulating the natural tempo of humans are provided. The method utilizes multiples of a basic unit of duration, or quantum unit, of human timing. Unconscious, but precise, compensations occur through imperceptible changes in the timing quantum level. An application of natural human tempo to improve the basic metronome function by humanizing it is also provided. Other ramifications of human tempo simulation are also discussed, including robots and computer games and graphics.

5 Claims, 2 Drawing Sheets

NATURAL HUMAN TIMING INTERFACE

CROSS-REFERENCE TO RELATED APPLICATIONS

This application is a continuation-in-part of U.S. patent application Ser. No. 11/523,194, filed Sep. 19, 2006, now abandon which is incorporated herein by reference in its entirety.

FIELD OF INVENTION

This application relates to metronomes and other musical training devices, as well as the rhythmic motion of robots, when the simulation of human motion and rhythm is desirable.

BACKGROUND OF INVENTION

This invention addresses the problem of the inhuman quality of metronomes. A metronome plays a central role in many devices besides a basic metronome. The function of a metronome is to provide a tempo, a series of audible or visual events with equal intervals of time between each event. The event could be the click or beep of a basic metronome. The events could be the underlying beat or tempo surrounded by a contraption of tones from a drum machine. The events could be slowed down in a guitar trainer, but the intervals of time between the events would still be equal. A metronome is a tempo generator.

The purpose of a basic metronome is to help musicians build confidence in their ability to keep a steady tempo. Tempo is the most critical quality of music. Unchanging intervals of time are necessary for musicians to stay in time together as they play music. A mistake in timing is so traumatic to music that it has been nick-named a "train wreck." A steady tempo is also necessary for dancers to keep step with the musicians, or for musicians to keep step with a conductor. A conductor could be a robot, and the rhythmic motions of the robot's arms would be controlled by a metronome. The musicians could be robots and their rhythmic motions of banging on drums or bowing strings would be controlled by a metronome. Electronically, the tempo of the robotic conductor could be calibrated to the tempo of the robotic musicians and the timing of their performance would seem congruent or "tight"—that is, until human musicians attempted to accompany them. The humans would stumble often, falling behind the beat and catching up or getting ahead of the beat and waiting, swearing that the robots were not keeping a steady tempo.

This is the same problem musician's have with conventional metronomes. Robots and other embodiments of a metronome all suffer the same inhuman shortcoming. While a metronome is not necessarily a robot or a drum machine, a robot or a drum machine is necessarily a metronome. The metronome function is central and indispensable to their programming. The prior art rarely addresses the 'unsteady tempo' problem because the incongruity between the humans and the electronics is generally blamed on the humans rather than the mathematically-perfect, electronic metronomes. The result is a lot of frustrated musicians that are led to believe that they don't have good rhythm, and their metronomes sit unused because they don't want to be reminded of it. Conventional metronomes have failed, therefore, to fulfill their purpose of building confidence in the ability musicians have keeping a steady tempo.

Conventional metronome manufacturers do not recognize or appreciate that, because of biomechanical factors, humans are only capable of performing a limited number of tempos, and that these tempos are precise and the same for all humans. These specific, natural human tempos and the experiments used to identify them are disclosed in the Preferred Embodiment and Theory of Operation sections below. Conventional metronomes usually provide tempos of every whole number of beats per minute (BPM) within the musically interesting range of 40 BPM and 200 BPM. The metronome user cannot distinguish 115 BPM from 116 BPM, so some manufacturers limit the available BPM values by skipping some of the whole numbers. Still, this is done arbitrarily, with no appreciation of natural human tempo. Conventional metronome users soon find themselves chasing or waiting for the beat because the tempos are not calibrated to the internal tempos inherent to a human, and humans cannot change their biomechanical processes, such as refractory periods, so they compensate by jumping around, like a train about to crash.

The natural human tempos are a precise and discrete set of fast, "primary" tempos that humans prefer, unconsciously, when making rhythmic motions with their skeletal muscles, the muscles utilized in playing music and dancing. As data from the experiment demonstrates, slower natural tempos are perfect multiples of the faster natural tempos, suggesting that the fast natural tempos serve as basic units of duration that are counted, unconsciously, to form the "sense" of time. These natural human tempos were isolated and tested in a tapping experiment described in the Theory of Operation below. When converted from milliseconds to beats per minute, none of the natural human tempos were whole numbers of BPM. All conventional metronomes, drum machines and the like use whole numbers and only whole numbers of BPM, regardless of their range or choice of tempos. The natural human tempos have never been applied to an electronic device because they have not, until now, been discovered and appreciated or even foreseen.

Unnatural tempos are the source of the frustration users have with conventional metronomes. Current science is teaching away from the significance of natural tempo. Richard Ivry is a prominent scientist in the field of human timing. Although Ivry recognizes that humans have biomechanical preferences, he states that "with equal proficiency humans can produce repetitive movements at any experimenter-defined rate." (Ivry, R. B and Richardson, T., 2002, Temporal control and coordination: The multiple timer model. *Brain and Cognition*, 48, p. 119). The present research demonstrates that this is not true. Unnatural experimenter-defined rates still elicited significantly more responses from nearby natural rates or tempos. Tapping is indicative of timing throughout the body. Pickers, drummers, and dancers all use different body motions, but they still perform corresponding tempo. Therefore, if a musician could practice an unnatural tempo enough to perfect it and perform it on stage, no one would be able to dance to it. No author has ever suggested applying these biomechanical tempo preferences to a metronome, as evidenced by the lack of such technology.

Several devices are available which change the tempo of an incoming signal, like a guitar trainer. A guitar trainer slows down an incoming audio signal, from a CD for instance, but without changing the pitch of the music. The users then practice the guitar lick of choice at the slower tempo. Incrementally, the users then speed up the tempo to practice playing faster and faster until they can play the lick at full speed. Again, none of these devices, such as the audio signal processing apparatus in patent publication number US 2001/0042434 A1 from Yamada et al., show any appreciation for natural human tempo.

Attempts have been made to acquire more human-like tempos by the tap-tempo methods. These methods ostensibly allow the users to tap the BPM value they want to practice. Conventional metronomes, drum machines, and the like round these BPM values to whole numbers. Natural human tempos do not fall on whole numbers of BPM. Some tap-tempo methods, like the method in U.S. Pat. No. 6,812,394 to Weissflog, 2004 Nov. 2, take several taps and average them, which also produces inhuman BPM values. Some drum machines utilize an archive of live, human drum tracks. This feature attempts to solve the inhuman problem, but as soon as the users touch the tempo control knob the tempo is arbitrary again.

Here I would like to emphasize the significance that a fraction of a second can make in a metronome. Suppose a musician chooses to play a song at 130 BPM. A conventional metronome would click once about every 460 milliseconds. In practice, however, the musician spontaneously plays quarter notes every 440 milliseconds. Within 10 seconds, or 22 beats, the musician would already be leading the metronome by a full beat. This would happen eighteen times during a three-minute song. Unchecked, the musician would finish the song eight seconds before the metronome. The discrepancy would be noticed much sooner, though, and the musician would probably plug along, chasing and waiting for the beat. These compensations may or may not be conscious, but a natural tempo would still be more comfortable.

Other attempts have been made to bridge the gap between metronomes and humans. An apparatus from U.S. Pat. No. 6,230,047 issued to McHugh allows incoming music to change tempo according to the user's heartbeat. While a heartbeat is natural, it is by no means a tempo. Tempo is an indefinite and unchanging series of temporal events. The rate of a heartbeat changes constantly. Also, hearts are not controlled by the same nervous system as the skeletal muscles, so they do not abide by the same limitations, such as refractory periods. Moreover, there is no satisfaction in music corresponding to a heartbeat rate. The physical motions of exercise, like dancing, are more pleasant when entrained with the tempo of music. The heart rate has nothing to do with this relationship. In practice, this device could actually have the opposite effect rather than its intended effect. Running uphill, for instance, would make the heart rate accelerate. If the tempo of music was increased correspondingly, runners would be inclined to quicken their steps to match the music, rather than slowing down to save their heart. In any case, McHugh did not discover natural human tempo as described here. There is no discrete set of tempos or heart rates, for that matter, listed, and they would never be found by recording spontaneous heart rates.

Another attempt at "humanizing" a metronome also fell short of the mark. U.S. Pat. No. 4,380,185 describes a conventional metronome with the temporal events being the sound of a human voice. Apparently, Holcomb realized that a human counting off time before or during a musical performance does a much better job establishing and maintaining a tempo than metronome (Description of the Prior Art, pp. 4-5). Holcomb blames the incongruence of humans and conventional metronomes on time signature and beat pattern, however, not tempo selection. Holcomb clearly does not understand the origin of the incongruence. He misappropriated the advantage of the human voice to the sound of the human voice rather than the natural tempo of the human voice. Holcomb did not catalog the time between every syllable of hundreds of spoken sentences to find a discrete set of preferred cadences of speech. His selection of tempo is arbitrary, "variable between a minimum and maximum frequency" (claim 1 a, pg. 2). Claim 10 states that the human voice is a function of the selected tempo not that the selected tempo is a function of the human voice. Neither Holcomb nor McHugh utilizes, suggests or predicts a discrete series of tempos best suited for human use.

On National Public Radio, during the Here and Now program on Jan. 25, 2006, Evan Ziporyn discussed the problem he and his team from MIT had making music with robots more humanlike. Their robots could make minute incremental changes in tempo that humans could not perform or even perceive. Ziporyn made no indication, however, that limited human tempo capability was the stumbling block in the goals of their technology.

OBJECTS AND ADVANTAGES OF THE INVENTION

Accordingly, the present invention satisfies the human quality long-sought for the aforementioned metronomes and related devices. Several objects and advantages of the present invention are:

(a) to provide a metronome with natural human tempos for accurate and indefinite human simulation rather than arbitrary tempos, like 130 BPM, which confuse and frustrate musicians.

(b) to improve guitar trainers, drum machines and other embodiments of a metronome by restricting the available cadences to the natural human tempos rather than arbitrary tempos (c) to facilitate the ability of humans and robots to accompany one another, musically.

Objects and advantages will become more apparent from a consideration of the ensuing description.

SUMMARY OF THE INVENTION

In accordance with the present invention a conventional metronome is improved by providing tempos which correlate to the biomechanical preferences of humans and excluding the arbitrary, whole number values of beats per minute. Humans have precise, biological limitations on the production of temporal intervals. The present invention is an appreciation of these limitations. The present invention also improves other devices derived from a metronome or utilizing a metronome.

DETAILED DESCRIPTION OF THE PREFERRED EMBODIMENT

Figure 1:
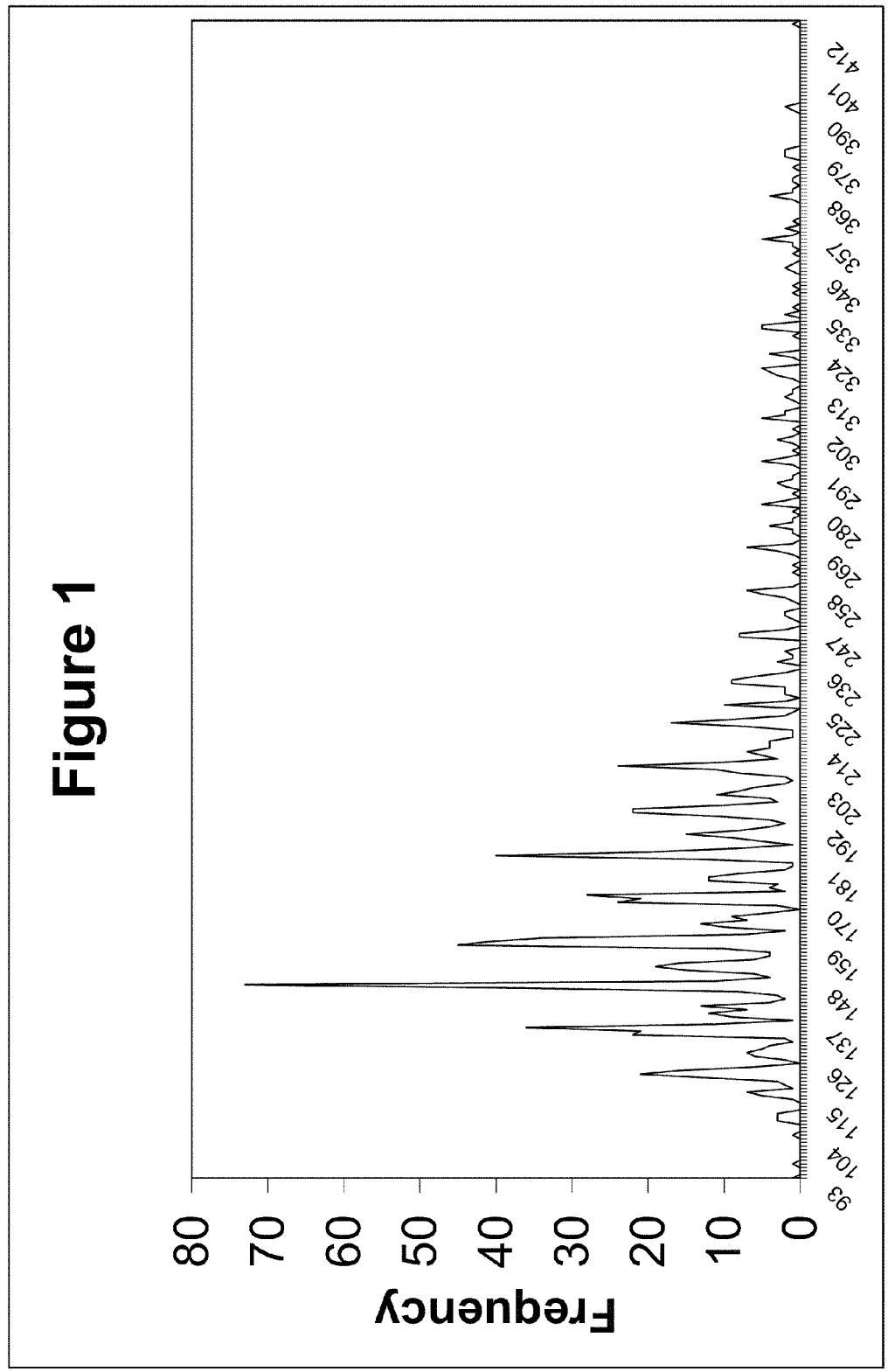
FIG. 1 is a graph of the relative frequency with which test subjects produced certain tempo intervals during experimentation.
Figure 2:
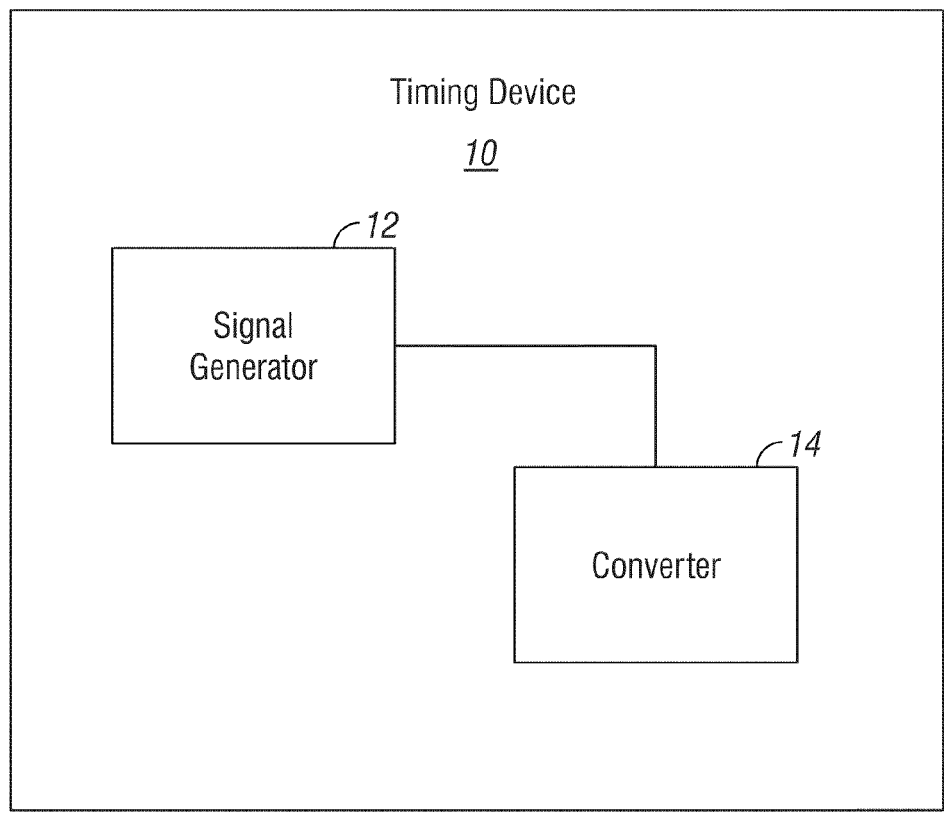
FIG. 2 is a drawing of the timing device 10 containing both the signal generator 12 and the converter 14.

A preferred embodiment of the present invention does not change any parts or interconnections of a conventional metronome. The improved metronome has only values of BPM corresponding to the natural human tempos. It will feel as though another human is keeping the beat rather than a computer. These are the natural human tempos and their corresponding BPM values:

110 ms—136.36 bpm
122 ms—122.95 bpm
135 ms—111.11 bpm
147 ms—102.04 bpm
159 ms—94.34 bpm
171 ms—87.72 bpm
183 ms—81.97 bpm
195 ms—76.92 bpm
208 ms—72.12 bpm
*220 ms—68.18 bpm
231 ms—64.94 bpm
*244 ms—61.48 bpm
256 ms—58.59 bpm
*269 ms—55.76 bpm
282 ms—53.19 bpm
*294 ms—51.02 bpm
305 ms—49.18 bpm
*318 ms—47.17 bpm
*330 ms—45.45 bpm
*342 ms—43.86 bpm
355 ms—42.25 bpm
*367 ms—40.87 bpm The asterisks denote independently found natural tempos which are precise multiples of faster natural tempos. The millisecond values are sixteenth-note tapping. The corresponding bpm values are quarter notes. At allegro and faster only eighth notes (tapping) are musically interesting as sixteenth notes become impossible. All of the preferred tempos above 136.36 bpm are eighth-note representations of their sixteenth-note counterparts. they are:

147 ms—204.08 bpm
159 ms—188.68 bpm
171 ms—175.44 bpm
183 ms—163.94 bpm
195 ms—153.84 bpm
208 ms—144.24 bpm
220 ms—136.36 bpm Operation Preferred Embodiment The manner of using the improved metronome is identical to that for metronomes in present use. Namely, the metronome user chooses a tempo from the tempos available on the metronome and plays along. The improved metronome has only values of BPM concurrent with natural human tempo. Users of the improved metronome, therefore, will not have to chase or wait for the beat as they do with conventional metronomes and their arbitrary tempos.

Theory of Operation

Musical time has traditionally been divided from the top down, from whole notes to their divisions of halves and quarters, and from quarter notes to their subdivisions of eighths and sixteenths. Nevertheless, humans actually establish tempo from the bottom up, by accenting multiples of the primary, preferred tempos listed above.

This hypothesis was confirmed by the present experiments. In the first experiment, subjects tapped eight sixteenth notes or every value of BPM on a conventional metronome. Every interval of time between every tap was recorded and graphed. FIG. 1 provides a summary of the results from these trials. Without natural human tempo, this curve would be smooth, not spiked. Sixteenth-notes of the faster tempos are closer together than sixteenth-notes of the slower tempos so more trials were concentrated in the faster intervals. This is why there is a curve in FIG. 1.

As can be seen from the data shown in FIG. 1, the subjects did not produce a random distribution of tempos. Instead, subjects had a preference for particular tempos, noted by the various peaks. The experiments indicate that individuals have a natural tendency to produce these particular tempos, as opposed to "artificial" tempos that are typically used in music instruction. Several of these tempos correspond to the tempos described and claimed in this application. As a result, it is believed that calibrating a metronome, guitar trainer, drum machine, or other music training device to produce these tempos will make it easier for a musician to follow with the desired tempo.

This conclusion is further bolstered by the fact that in attempting to reproduce the various artificial tempos, subjects generally alternated between two "natural" tempos in order to attempt to duplicate the artificial tempo, resulting in the subject continually being slightly ahead or slightly behind the beat. If the tempo sought to be reproduced is a natural human tempo, it should be much easier for individuals to track and follow, as it would not be necessary to make the minute modifications to the individual's "internal" tempo to attempt to reproduce the "artificial" tempo.

A second experiment used fewer faster trials and additional slower trials, also lessening the overall number of trials per experiment. This flattened the curve, and the preferences remained the same. While no subject ever performed a tempo perfectly, attempts at the natural tempos were much closer and apparently possible. Unnatural tempos were apparently impossible to reproduce with fidelity, since subjects compensated by jumping between adjacent natural tempos, behavior that does not look or feel like a tempo at all.

Conclusively, the only tempos possible to recreate perfectly would be the tempos correlating to these natural preferences. A metronome containing these natural human tempos, and excluding the conventional tempos, would be a substantial improvement over the conventional metronome as it would actually serve the purpose of a metronome, to help musicians gain confidence in their ability to keep tempo. It is possible for electronics to produce a beat at any preselected interval, so it is well within the ability of one of ordinary skill in the art to program a metronome or other electronic device to produce the above-described tempos, either in addition to or to the exclusion of "conventional" tempos.

Alternative Embodiments

As well as a device itself, a metronome can be a primary function of another device. The present invention is an improvement of the metronome function of such a device; namely, the function of providing equal temporal indices of motion or sound. Applications are not limited to the musical training devices described here. For example, in addition to a guitar trainer, drum machine, or robot, the present invention may be embodied in any other device capable of producing such equal temporal indices, such as, for example, a computer.

Description—Guitar Trainer:

The present invention does not change any parts or interconnections of a conventional guitar trainer. The values of BPM are programmed to coincide with natural human tempo, and such programming can be done with currently-available electronics.

Operation—Guitar Trainer:

The manner of using the improved guitar trainer is identical to that for guitar trainers in present use. Like the basic, improved metronome, improved guitar trainer users will not be discouraged by chasing or waiting for the beat.

Description—Drum Machine:

The present invention does not change any parts or interconnections of a conventional drum machine. The values of BPM are programmed to coincide with natural human tempo.

Operation—Drum Machine:

The manner of using the improved drum machine is identical to that for drum machines in present use. Like the basic, improved metronome, improved drum machine users will not be discouraged by chasing or waiting for the beat.

Description—Robot:

The present invention does not change any parts or interconnections of a conventional robot. Rhythmic motion of the improved robot coincides with natural human tempo.

Operation—Robot:

The manner of using the improved robot is identical to that for robots in present use. The improved human-like quality of the robot opens up many possibilities for the relationship of humans and robots. Robots could instruct humans in more difficult musical skills, like gradual changes in tempo. Humans could, therefore, benefit not only by gaining confidence in how they can already perform naturally, but also by learning to reach their potential. Robots and humans could improvise and jam together if they operated in the same temporal atmosphere.

CONCLUSION, RAMIFICATIONS, AND SCOPE

Behind all the bells and whistles of robots and drum machines is the basic metronome function of providing a steady cadence for motions and sounds. By adhering to tempos that humans produce naturally, these devices will seem more human themselves.

While my above description contains specific data, this should not be construed as a limitation on the scope of the invention, but rather as an exemplification of a preferred embodiment. This simple invention has a broad scope. Other ramifications for natural human timing include animation, computer games and graphics, and software versions of metronomes and their derivatives. Revisions or improvements to the data or the theory are not exempt from the novelty presented here, which is the appreciation and application of this scientific data to improve existing devices.

Accordingly, the scope of the invention should be determined not by the embodiments described, but by the appended claims and their legal equivalents.

I claim:

1. A timing device, comprising:
   (a) A signal generator that generates signals according to a selected desired timing scheme; and
   (b) a converter capable of converting said signals to a format perceptible by humans;
   wherein said desired timing scheme is selected from the group consisting of intervals of 110 ms (136.36 bpm), 122 ms (122.95 bpm), 135 ms (111.11 bpm), 147 ms (102.04 bpm), 159 ms (94.34 bpm), 171 ms (87.72 bpm), 183 ms (81.97 bpm), 195 ms (76.92 bpm), 208 ms (72.12 bpm), 220 ms (68.18 bpm), 231 ms (64.94 bpm), 244 ms (61.48 bpm), 256 ms (58.59 bpm), 269 ms (55.76 bpm), 282 ms (53.19 bpm), 294 ms (51.02 bpm), 305 ms (49.18 bpm), 318 ms (47.17 bpm), 330 ms (45.45 bpm), 342 ms (43.86 bpm), 355 ms (42.25 bpm), 367 ms (40.87 bpm), 147 ms (204.08 bpm), 159 ms (188.68 bpm), 171 ms (175.44 bpm), 183 ms (163.94 bpm), 195 ms (153.84 bpm), 208 ms (144.24 bpm), and 220 ms (136.36 bpm), or multiples thereof.

2. The timing device of claim 1 wherein the signal generator comprises a metronome.

3. The timing device of claim 1 wherein the signal generator comprises a guitar trainer.

4. The timing device of claim 1 wherein the signal generator comprises a drum machine.

5. The timing device of claim 1 wherein the signal generator comprises a robot.

\* \* \* \* \*

UNITED STATES PATENT AND TRADEMARK OFFICE
CERTIFICATE OF CORRECTION

| | | |
|---|---|---|
| PATENT NO. | : 8,017,853 B1 | Page 1 of 1 |
| APPLICATION NO. | : 12/177009 | |
| DATED | : September 13, 2011 | |
| INVENTOR(S) | : Rice | |

It is certified that error appears in the above-identified patent and that said Letters Patent is hereby corrected as shown below:

Column 8, Line 27
DELETE: ", or multiples thereof"

Signed and Sealed this
Twenty-ninth Day of November, 2011

David J. Kappos
*Director of the United States Patent and Trademark Office*